3,042,481
MELT-SPINNING METHOD
Alva C. Coggeshall, Pensacola, Fla., assignor, by mesne assignments, to Monsanto Chemical Company, a corporation of Delaware
Filed Aug. 5, 1960, Ser. No. 47,804
1 Claim. (Cl. 18—54)

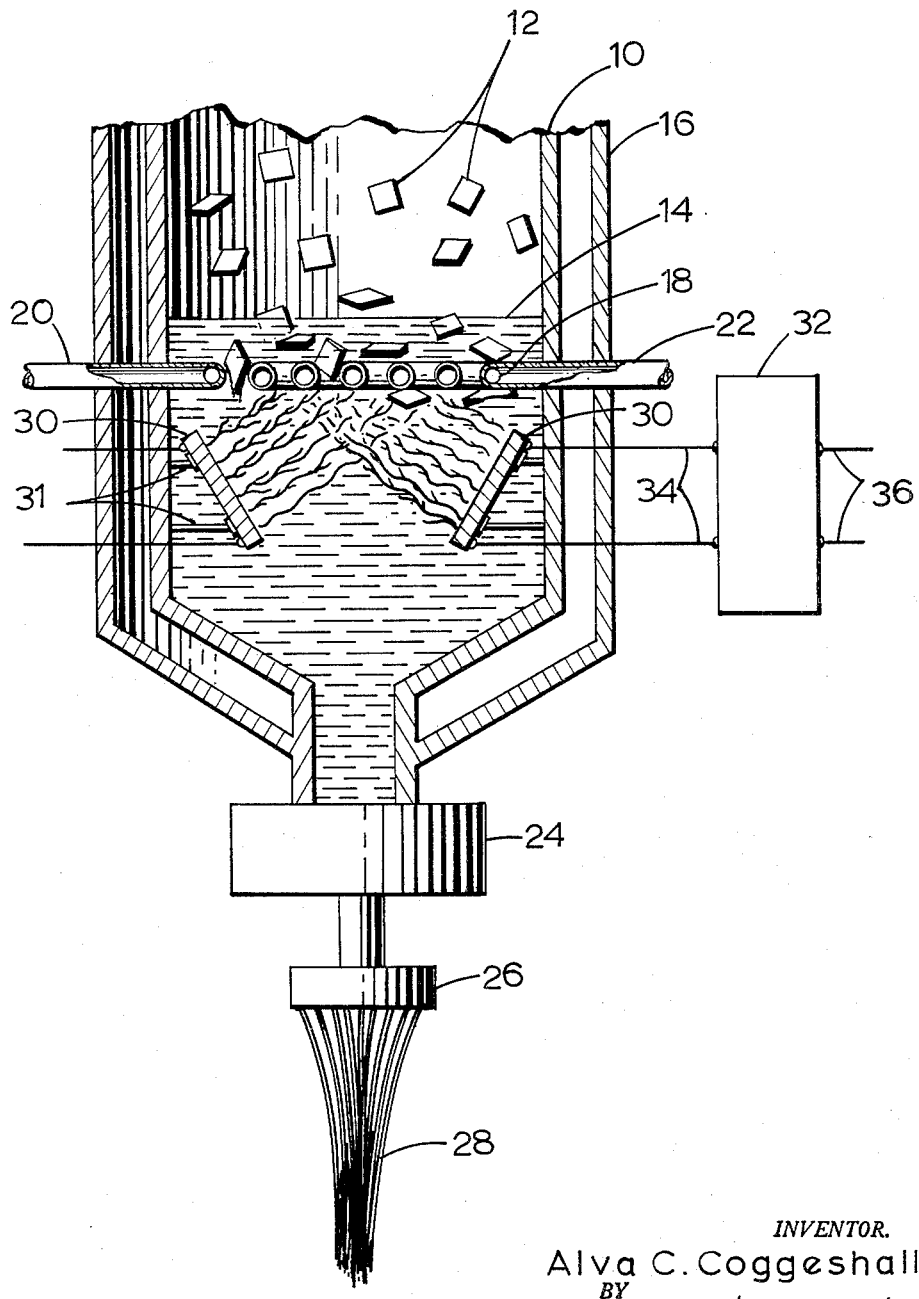

This invention relates to improvements in the treatment of molten fiber-forming polymers. More particularly the invention relates to a method for treating molten polycarbonamides prior to extrusion thereof into shaped articles such as ribbons, films, filaments and the like.

In the manufacture of filaments from highly polymeric filament-forming compositions by melt-spinning procedures, the polymer to be shaped into filaments is normally heated to the molten state but below the decomposition temperature thereof. Then, the molten mass is extruded at a constant rate and under pressure through small orifices in a spinneret to form continuously molten streams of polymer of relatively small diameters. The molten polymer streams issuing from the spinneret are directed vertically downward from the spinneret into a cooling atmosphere, usually air, where the streams are cooled and caused to solidify into individual filaments. In one commercial process for producing textile filaments from polycarbonamides which may be made from a suitable diamine and a suitable dibasic acid or stem a polymerizable amino organic acid, the polymer in a flake or chip-like form is melted by being brought into contact with a heated surface or grid in a melting container; the resulting melt is then metered to and through the orifices in a spinneret by means of a pump. Normally the melted polymer before extrusion thereof is held in the container in which it is melted for an extended time, for example up to two hours. It has been observed that thermal degradation or other undesirable changes occur in the polymer while the same is in the container and in contact with the melting gird with the result that undesirable gelled polymer is produced during its dwell period in the container. Furthermore, it has been found that with the use of heretofore known melt-spinning devices portions of the melted polymer tend to remain in a relatively stagnant or physical inert condition. It is believed that this enervating climate results in inferior heat transfer and is thought to contribute significantly to the formations of clusters of obnoxious materials commonly referred to as polymer "gels." The gelled polymer adheres to the interior walls of the melt-spinning apparatus and on the melting grid, thereby causing a build up of an insulating layer which reduces the rate of heat transfer. Although the chemical composition of these "gels" is not precisely understood, it is known that the presence of such causes a substantial reduction of the quality of the filaments and gives rise to numerous processing problems.

Various means have been proposed to minimize the aforesaid gel formation occurring in the conventional melt-spinning apparatus and to avoid accumulation of gelled polymer on the heated metal surfaces in the apparatus. One suggested way to obviate the gel accumulation problem includes applying a coating of polyorganosiloxane to any metal surfaces in contact with molten polymer. While this suggested operation temporarily reduces the gelled polymer accumulation of the melting surfaces of the grid and on other surfaces in the melt-spinning apparatus, the coating of polyorganosiloxane must be applied at frequent intervals, thereby necessitating periodic and expensive equipment shut-downs.

It is an object of the present invention to provide a method for melting filament-forming synthetic thermoplastic polymers and temporarily holding the resulting polymer melt with a substantial reduction of gelled polymer formation and accumulation.

It is another object of the present invention to provide a method for melt-spanning filament-forming synthetic thermoplastic polymers utilizing ultrasonic energy to avoid in a marked degree the formation and accumulation of gelled polymer in melt-spinning apparatus.

It is also an object of the invention to provide a method for melting filament-forming polymers of the polycarbonamide type which includes the employment of ultrasonic energy in a highly specialized manner so as to substantially reduce the formation and accumulation of gelled polymer.

Other objects will become apparent from the following description of the invention.

Briefly stated, the above-mentioned objectionable formation of gelled polymer can be minimized by bringing solid particles of a filament-forming synthetic thermoplastic polymer of suitable size into contact with a heated surface to melt the polymer while submerged in a melt of such polymer and by transmitting ultrasonic vibrational energy through the melt to the heated surface. As indicated above, the purpose of such a treatment is to minimize the gel formation in the molten polymer and to prevent the accumulation of gelled polymer on the heated surface.

The apparatus, by means of which the method of the invention conveniently may be practiced, comprises a container or the like for receiving and melting solid filament-forming polymers which are preferably in the form of small flakes or chips. The container is adapted to hold the resulting polymer melt for eventual extrusion thereof into shaped objects. The container includes a heated surface such as a heated melting grid disposed interiorly thereof for heating the solid chips of polymer to a temperature above the melting point of the polymer but below that temperature which the polymer would be decomposed. Mounted by suitable means within the container is an ultrasonic transducer which can be energized by conventional generator means to produce ultrasonic compressional waves. In a preferred embodiment these waves emanated from the said transducer are transmitted through the molten polymer and are directed or focused toward the heated surfaces used to heat the solid polymer to a molten condition.

The novel features which are believed to be characteristic of the invention are set forth with particularity in the appended claims.

The invention itself, however, both as to its organization and method of operation, may be best understood by reference to the following description taken in conjunction with the accompanying drawing in which there is shown a vertical section of a melt-spinning apparatus with associated structure being shown schematically for purposes of illustration.

With reference now to the drawing, the apparatus illustrated partly in vertical section and partly schematically is adapted to be supported in a suitable manner and comprises an inner container 10 which may take the form of a cylinder as illustrated. The container is provided with an upper opening (not shown) for receiving solid flakes or chunks of polymer 12 from a suitable source overhead. Preferably the flakes are fed continuously into the container at a predetermined rate correlated with the extrusion rate such that a predetermined level or melt pool of molten polymer 14 is maintained in the bottom portion of the container from which the polymer is metered to a spinning zone. In order to prevent oxidization of the polymer a blanket of inert gas such as steam, nitrogen gas and the like is maintained over the molten polymer, especially where a white polymer is desired. Heat is supplied to the container 10 and thence is transferred to the contents therein by means of a heating medium or fluid or other conventional heating means. As illustrated a jacket 16 is suitably secured to the outer periphery of the container 10 in order to hold a fluid in heat transfer relation with the molten polymer in container 10. The jacket 16 is provided with an inlet and outlet for passing continuously a heating medium or fluid of a well-known type such as "Dowtherm" or the like therethrough in heat transfer relationship with the molten polymer within the container.

Inside the container 10 there is mounted a melting unit 18. As illustrated this unit takes the form of a doubled flat spiral coil, although other designs for this heating coil may be used just as well. The melting unit is positioned in the container at a point below the level of the pool of molten polymer normally therein, preferably at a point just below this level. The melting unit may be heated by the passage of a hot fluid such as "Dowtherm" or the like through the inlet 20 and from the outlet 22.

The molten polymer is conveyed from the container 10 by means such as a pump 24 adapted to meter and to pump the polymer from the bottom thereof to a spinneret assembly 26. A bundle of filaments 28 is formed by the extrusion of the molten polymer through small orifices disposed in the face of the spinneret of the said assembly in accordance with conventional melt-spinning procedures.

A plurality of supersonic transducers 30 comprising a piezoelectric material, magnetostrictive material or the like are positioned interiorly of the container 10 is spaced relation therewith and circumferentially arranged therein. While there are illustrated a plurality of transducers, it will be readily appreciated one may be used as well. Furthermore, the transducer may take the form of a unitary circular or annular member. The emission surface of the transducer may be flat as shown in the drawing or may be concave, depending on how one might want to focus or direct the vibrational energy derived from the transducer during the operation thereof. Two ultrasonic transducers 30 are shown for convenience of illustration as being mounted on support members 31 at an angle with respect to the long axis of container 10 so that the ultrasonic vibrational energy is directed radially inwardly and generally upwardly, whereby the energy is concentrated in and directed to the vicinity where the polymer chips are initially melted by contact with the aforesaid heating unit.

An ultrasonic generator 32 or like high frequency power producing means is suitably connected with the transducers 30 such as by electrical conductor 34. Lines 36 are the illustrated power supplying means for generator 32.

A preferred material from which the ultrasonic piezoelectric transducers are molded or manufactured is polycrystalline barium titanate. This material has the electromechanical property of expanding in the direction of polarization when the signal voltage applied to the material is of one polarity and contracting at reversal of the signal voltage. The material is contracted in a direction transversely of the field of polarization when the material is expanded in the direction of the field. Materials other than the barium titanate such as a quartz crystal can be used to accomplish the same purpose. As indicated above, magnetostrictive material including such metals as iron, nickel and cobalt and certain magnetostrictive alloys may be used as the transducer material. Ultrasonic energy as employed herein is readily derived by employing frequencies in the range of several thousands to more than a billion cycles per second. High frequency generators are readily available on the market for production of power in frequencies of this range and may be readily used with the piezoelectric and magnetostrictive transducers described herein for the practice of the present invention.

The melt-spinnable polymers to whose melt ultrasonic energy is applied in accordance with the present invention generally includes any suitable substance that can be melt-spun. As examples of fiber-forming synthetic thermoplastic polymers capable of being melt-spun the following may be mentioned: polyethylene; polypropylene; polyurethanes; copolymers of vinyl acetate and vinyl chloride; the copolymers of vinylidene chloride and a minor proportion of vinyl chloride; linear polyesters of aromatic dicarboxylic acids and dihydric compounds, such as polymeric ethylene terephthalate and the polyester derived from the terephthalic acid and bis-1,4-(hydroxymethyl) cyclohexane; linear polycarbonamides such as, for example polymeric hexamethylene adipamide, polymeric hexamethylene sebacamide, polymeric monoaminocarboxylic acids, such as polymeric 6-aminocaproic acid; and other fiber-forming thermoplastic polymers. Mixtures of such fiber-forming synthetic polymers also can be used. The process of this invention is applicable particularly for the treatment of polymers generically referred to as nylon, including nylon-66, nylon-4, nylon-6, nylon-610, nylon-11, and their fiber-forming copolymers, e.g., 6/66, 6/610/66, 66/610, etc.

It is now apparent that the present invention provides a novel method for melting thermoplastic polymers and treating the melt thereof by means of ultrasonic compressional waves, whereby gel formation and accumulation are minimized. The vibrational energy treatment results in polymer uniformity and improved quality of filaments, fibers and films formed from the treated polymer. Another advantage derived from using ultrasonic equipment of this nature is that the melt chamber may be used for a more extended period of time without cleaning. Melt-spinning devices conventionally used without substantial modification thereof can be conveniently altered to practice the present invention without incurring a great expense. The use of ultrasonic vibrational energy during the melting of melt-spinnable polymers provides numerous other advantages.

While the invention has been described in terms of preferred embodiments thereof, it is to be understood that variations from the details disclosed herein might be made without departing from the scope and spirit of the invention. Accordingly, the invention is to be limited only by the claims set forth hereinafter.

What is claimed is:

In the process of melting nylon chips wherein nylon chips are melted by contact with a melting grid disposed in a melt reservoir and the resulting melt is withdrawn therefrom, the improvement comprising contacting nylon chips with a heated melting grid to melt same, maintaining the level of the resulting melt in the reservoir to a level above the melting grid, transmitting ultrasonic compressional waves through the resulting melt, said waves being emanated interiorly of said reservoir, and focusing said waves towards said grid to concentrate the energy of said waves in the vicinity where the nylon chips are initially melted.

References Cited in the file of this patent
UNITED STATES PATENTS

| | | |
|---|---|---|
| 2,470,741 | Gordon | May 17, 1949 |
| 2,683,073 | Pierce | July 6, 1954 |